(12) United States Patent
Hiernaux

(10) Patent No.: US 10,443,416 B2
(45) Date of Patent: Oct. 15, 2019

(54) CASING WITH SUCTION ARM FOR AXIAL TURBINE ENGINE

(71) Applicant: Stephane Hiernaux, Oupeye (BE)

(72) Inventor: Stephane Hiernaux, Oupeye (BE)

( * ) Notice: Subject to any disclaimer, the term of this patent is extended or adjusted under 35 U.S.C. 154(b) by 199 days.

(21) Appl. No.: 15/707,663

(22) Filed: Sep. 18, 2017

(65) Prior Publication Data

US 2018/0087391 A1 Mar. 29, 2018

(30) Foreign Application Priority Data

Sep. 27, 2016 (BE) .................................. 2016/5720

(51) Int. Cl.
| | | |
|---|---|---|
| *F01D 9/04* | (2006.01) | |
| *F01D 25/24* | (2006.01) | |
| *F02C 7/04* | (2006.01) | |
| *F04D 29/68* | (2006.01) | |
| *F01D 5/14* | (2006.01) | |
| *F01D 9/06* | (2006.01) | |
| *F02C 9/18* | (2006.01) | |
| *F01D 25/16* | (2006.01) | |
| *B64D 33/02* | (2006.01) | |

(52) U.S. Cl.
CPC .............. *F01D 9/04* (2013.01); *F01D 5/145* (2013.01); *F01D 9/06* (2013.01); *F01D 9/065* (2013.01); *F01D 25/24* (2013.01); *F02C 7/04* (2013.01); *F02C 9/18* (2013.01); *F04D 29/682* (2013.01); *F04D 29/684* (2013.01); *B64D 2033/0226* (2013.01); *F01D 25/162* (2013.01); *F05D 2270/17* (2013.01); *Y02T 50/673* (2013.01)

(58) Field of Classification Search
None
See application file for complete search history.

(56) References Cited

U.S. PATENT DOCUMENTS

| | | | | |
|---|---|---|---|---|
| 5,357,744 | A * | 10/1994 | Czachor ................. | F01D 9/065 415/134 |
| 8,092,153 | B2 * | 1/2012 | Strecker ................. | F01D 9/065 415/115 |
| 2009/0104027 | A1 * | 4/2009 | Duchatelle ............. | F01D 9/065 415/175 |
| 2013/0051426 | A1 * | 2/2013 | Gaully ................... | F01D 17/085 374/144 |
| 2014/0311161 | A1 * | 10/2014 | Bellabal ................. | F01D 5/145 60/796 |
| 2015/0251281 | A1 * | 9/2015 | Hebuterne ............. | B23K 9/124 219/76.14 |

(Continued)

*Primary Examiner* — Michael Lebentritt
(74) *Attorney, Agent, or Firm* — Eldredge Law Firm; Richard Eldredge

(57) ABSTRACT

The invention concerns a support casing (24) for a rotor (12) of a turbine engine such as a ducted fan turbojet engine used for propulsion of an aircraft. The casing (24) comprises: an outer annular wall (38) with an inner annular surface (44); an inner hub (40) able to support the rotor (12) of the axial turbine engine and comprising an outer annular surface (42); an annular passage (46) between the annular wall (38) and the inner hub (40); an annular row of arms (48) passing radially through the annular passage (46). Each arm (48) of the casing (24) comprises an orifice (50) arranged in the annular passage (46) radially at the level of one of said annular surfaces (42; 44). Inserts are fitted to the orifices (50) to control the flow passing through.

20 Claims, 3 Drawing Sheets

(56) References Cited

U.S. PATENT DOCUMENTS

| | | | |
|---|---|---|---|
| 2015/0308289 A1* | 10/2015 | Lacroix | F01D 9/02 |
| | | | 415/214.1 |
| 2015/0345335 A1* | 12/2015 | Kockenpo | F01D 9/065 |
| | | | 415/116 |
| 2015/0345400 A1* | 12/2015 | Scott | F01D 9/065 |
| | | | 60/796 |
| 2015/0354386 A1* | 12/2015 | Chuong | F01D 25/30 |
| | | | 415/182.1 |
| 2016/0010501 A1* | 1/2016 | Cameau | F01D 9/065 |
| | | | 415/144 |
| 2016/0153314 A1* | 6/2016 | Lukowski | F01D 17/105 |
| | | | 415/208.1 |
| 2017/0159489 A1* | 6/2017 | Sennoun | F01D 25/125 |
| 2018/0058471 A1* | 3/2018 | Vyvey | F01D 17/162 |
| 2018/0209304 A1* | 7/2018 | Hiernaux | F01D 25/246 |
| 2018/0291841 A1* | 10/2018 | Lacroix | F02K 3/075 |

* cited by examiner

CASING WITH SUCTION ARM FOR AXIAL TURBINE ENGINE

TECHNICAL FIELD

The invention concerns a support casing for an axial turbine engine. More precisely, the invention relates to a casing forming a structure supporting a rotor of the turbine engine. The invention also concerns an axial turbine engine, in particular an aircraft turbojet engine or an aircraft turboprop engine.

PRIOR ART

The transmission shafts of a turbojet engine are supported by the structural frame. This frame allows the thrust force to be transmitted to the associated aircraft. It forms a structural connection between the various compression and expansion units for the annular flow of the turbojet engine. Also, as well as supporting the fan, it allows the low-pressure and high-pressure shafts to be mounted in articulated fashion on the stator of the turbojet engine.

The structural frame comprises in particular a support casing with an outer rim and an inner hub. These parts are connected by a circular row of casing arms which allow forces to be communicated. In the field of turbojet engines, these arms must be strong; this means they must be thickened and their number increased. Their width however must remain limited in order not to disrupt the annular flows passing through. Therefore two contradictory requirements must be observed simultaneously.

Document US 2010/0150700 A1 discloses a ducted fan turbojet engine. Casing arms forming supports pass through one of its annular sleeves.

Upstream, these arms comprise leading faces equipped with flow extraction scoops. These scoops are arranged halfway along the height and are equipped with controllable shutters. The latter are integrated in the thickness of the arms. The shape of these casing arms disrupts the flow such that the efficiency of the turbojet engine is penalised.

SUMMARY OF THE INVENTION

Technical Problem

The aim of the invention is to solve at least one of the problems posed by the prior art. More precisely, the aim of the invention is to improve the efficiency of the turbine engine equipped with a support casing with casing arms. Another aim of the invention is to propose a simple, strong, lightweight, economic and reliable solution which is easy to produce, simple to maintain and convenient to inspect.

Technical Solution

The object of the invention is a support casing for a rotor for an axial turbine engine, in particular a turbojet engine, the casing comprising: an outer annular wall with an inner annular surface; an inner hub able to support the rotor of the axial turbine engine and comprising an outer annular surface; an annular passage between the annular wall and the inner hub; an annular row of arms passing radially through the annular passage; distinguished in that the annular row comprises a first arm with an orifice arranged in the annular passage at the level of one of said annular surfaces.

According to an advantageous embodiment of the invention, each orifice of an arm is arranged in the downstream half or third of the corresponding arm.

According to an advantageous embodiment of the invention, the support casing is one piece and/or integral, optionally integrally cast.

According to an advantageous embodiment of the invention, the annular row of strut arms is one piece and/or integrally cast.

According to an advantageous embodiment of the invention, the orifice and/or the annular row of strut arms is/are axially level the bearing.

According to an advantageous embodiment of the invention, the first arm comprises a trailing edge, the orifice being arranged on the trailing edge.

According to an advantageous embodiment of the invention, the first arm comprises an axial portion, the width of which reduces in the downstream direction, at least one or each orifice being arranged in said axial portion.

According to an advantageous embodiment of the invention, the first arm comprises a surface forming a connecting radius with one of the annular surfaces, the orifice being formed in the connecting radius.

According to an advantageous embodiment of the invention, the first arm of the casing comprises a plurality of orifices arranged in the annular passage at the level of one of said annular surfaces, or at the level of both annular surfaces.

According to an advantageous embodiment of the invention, the first arm of the casing comprises two opposing side faces, the orifices being distributed between said two side faces.

According to an advantageous embodiment of the invention, the row also comprises a second arm with at least one second orifice arranged in the annular passage at the level of one of said annular surfaces, the orifice of the first arm being concealed from the orifice of the second arm by the outer surface of the hub; wherein said orifices may radially lie at the level of the inner annular surface.

According to an advantageous embodiment of the invention, the axial length of at least one or each arm is greater than the radial spacing between the inner annular surface and the outer annular surface, perhaps at least twice as great.

According to an advantageous embodiment of the invention, at least one or each orifice comprises an insert for controlling the trailing suction.

According to an advantageous embodiment of the invention, the passage comprises a thickness E between the annular wall and the inner hub, the or at least one or each orifice being arranged in at least one end of the arm along the thickness E; each end of the arm represents at most 10% of thickness E, or at most 5%.

According to an advantageous embodiment of the invention, at least one or each orifice is arranged, along the thickness E, at the level of one of the annular surfaces.

According to an advantageous embodiment of the invention, the radial spacing may be a minimum or medium radial spacing.

According to an advantageous embodiment of the invention, the or each orifice is a boundary layer suction orifice, radially at the level of a radial end of the arm.

According to an advantageous embodiment of the invention, the orifices form one or more alignment(s), at least one or each alignment closely following the associated annular surface.

According to an advantageous embodiment of the invention, the arms of the annular row are identical, each comprising identical orifices.

According to an advantageous embodiment of the invention, the arms of the annular row are arms connecting the hub to the annular wall, and/or extend radially from the wall to the hub.

According to an advantageous embodiment of the invention, the annular row comprises between four and thirty arms, or between six and twenty arms, or between eight and twelve arms, the values being inclusive.

According to an advantageous embodiment of the invention, the hub and/or the wall comprises one or more annular fixing flanges extending radially, in particular from an axial end.

According to an advantageous embodiment of the invention, the arms, the hub and the wall form a monobloc assembly and may in some cases be made of the same material.

According to an advantageous embodiment of the invention, each orifice is arranged at least 10 mm, or at least 6 mm, or at least 2 mm from the associated annular surface; in some cases, at least one or each orifice lies flush with its associated surface.

According to an advantageous embodiment of the invention, the orifices are distributed axially over the downstream half or third of the associated arm.

According to an advantageous embodiment of the invention, the width, in particular the diameter, of at least one or each orifice is less than 10 mm, or 5 mm, or 3 mm, or 1 mm, or 0.5 mm.

The annular surfaces and the positioning of the orifice relative to said surfaces are not essential aspects of the invention. The invention also concerns a support casing of a rotor for an axial turbine engine, the casing comprising: an outer annular wall; an inner hub adapted to support the rotor of the axial turbine engine; in some cases an annular passage between the annular wall and the inner hub; and an annular row of arms radially connecting the annular wall to the hub; distinguished in that at least one of the radial ends of the casing arms comprises an orifice opening between the annular wall and the inner hub.

The invention also concerns a turbine engine comprising at least one rotor support casing, distinguished in that the casing conforms to the invention, preferably the turbine engine comprises a rotor supported by the support casing.

According to an advantageous embodiment of the invention, the turbine engine comprises a compressor with at least one annular row of stator vanes, at least one of said stator vanes being in the axial extension of the or one of the orifices.

According to an advantageous embodiment of the invention, along the circumference, the width of the arms is greater than twice or four times the width of the stator vanes.

According to an advantageous embodiment of the invention, the first arm comprises a housing, the turbine engine comprising a movable element arranged in said housing, at least one orifice of the first arm being remote from said movable element, in particular axially remote.

According to an advantageous embodiment of the invention, the hub delimits a pressurised chamber in communication with the or several orifices.

According to an advantageous embodiment of the invention, the turbine engine comprises a bearing mounted inside the hub, the rotor comprising a transmission shaft mounted in articulated fashion via said bearing.

According to an advantageous embodiment of the invention, the turbine engine comprises a fan supported axially and/or radially by the hub of the casing.

According to an advantageous embodiment of the invention, the turbine engine comprises a separating nose fixed in circular fashion to the outer annular wall.

According to an advantageous embodiment of the invention, the compressor comprises an outer shroud which supports the stator vanes, said outer shroud being fixed in circular fashion to the outer annular wall.

According to an advantageous embodiment of the invention, the stator vanes are at least two times shorter axially than the or each casing arm, in some cases at least four times shorter.

In general, the advantageous embodiments of each object of the invention are also applicable to the other objects of the invention. As far as possible, each object of the invention may be combined with the other objects. The objects of the invention may also be combined with the embodiments of the description, which may also be combined together.

Advantages Brought

The invention limits the amplification of vortices at the boundary layers. The flow in the boundary layers becomes less turbulent. The efficiency is preserved since the effect of these vortices is less on the downstream compressor stage. This solution allows the mechanical strength of the arms, the hub and the wall to be retained. The openings lying flush with the passage avoid the creation of disturbances there.

DESCRIPTION OF EMBODIMENTS

In the description below, the terms "inner" and "outer" refer to a positioning relative to the rotation axis of an axial turbine engine. The axial direction corresponds to the direction along the rotation axis of the turbine engine. The radial direction is perpendicular to the rotation axis. "Upstream" and "downstream" refer to the main flow direction of the flows in the turbine engine.

Figure 1:
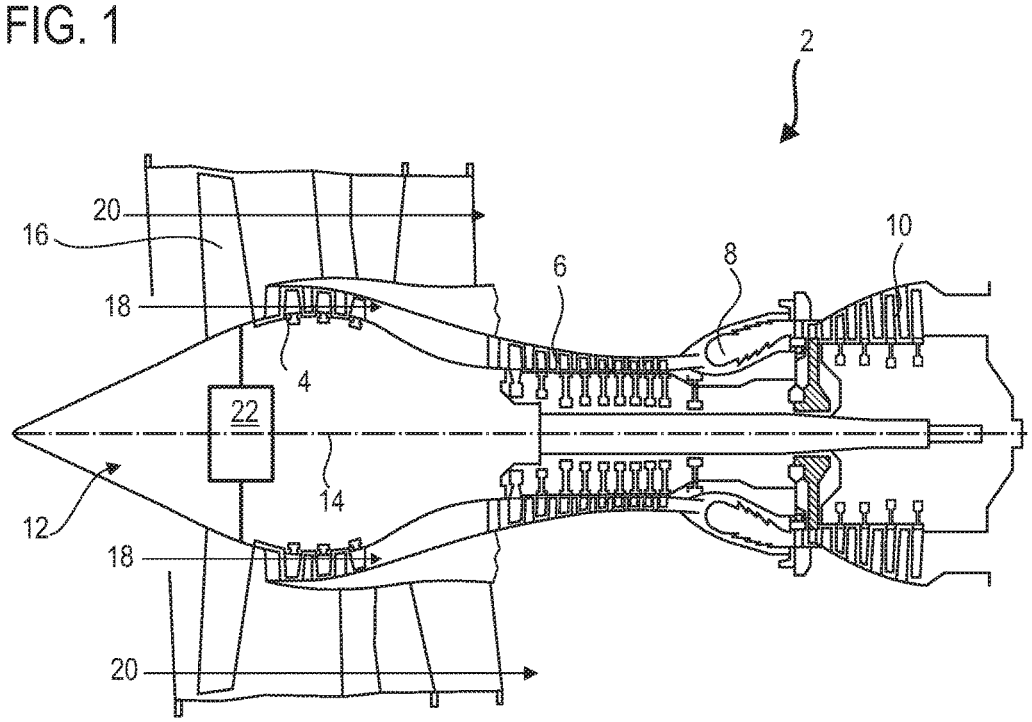
FIG. 1 shows an axial turbine engine according to the invention.

FIG. 1 shows in simplified fashion an axial turbine engine. In this case, it is a ducted fan turbojet engine. The turbojet engine 2 comprises a first compression level called the low-pressure compressor 4, a second compression level called the high-pressure compressor 6, a combustion chamber 8 and one or more levels of turbines 10. In operation, the mechanical power of the turbine 10 transmitted via the central shaft to the rotor 12 sets the two compressors 4 and 6 in motion. The latter comprise several rows of rotor vanes associated with rows of stator vanes. The rotation of the rotor around its rotation axis 14 thus allows creation of an air flow and its progressive compression up to the inlet of the combustion chamber 8.

An inlet fan, also known as a blower 16, is coupled to the rotor 12 and generates an air flow which divides into a primary flow 18 passing through the various above-mentioned levels of the turbine engine, and a secondary flow 20 passing through an annular conduit (partially shown) along the machine in order then to rejoin the primary flow at the turbine outlet. Demultiplication means 22, such as an epicyclic reduction mechanism, allow the rotation speed of the fan 16 and/or the low-pressure compressor 4 to be reduced relative to the associated turbine. The secondary flow 20 may be accelerated so as to generate a thrust reaction necessary for the flight of an aircraft.

Figure 2:
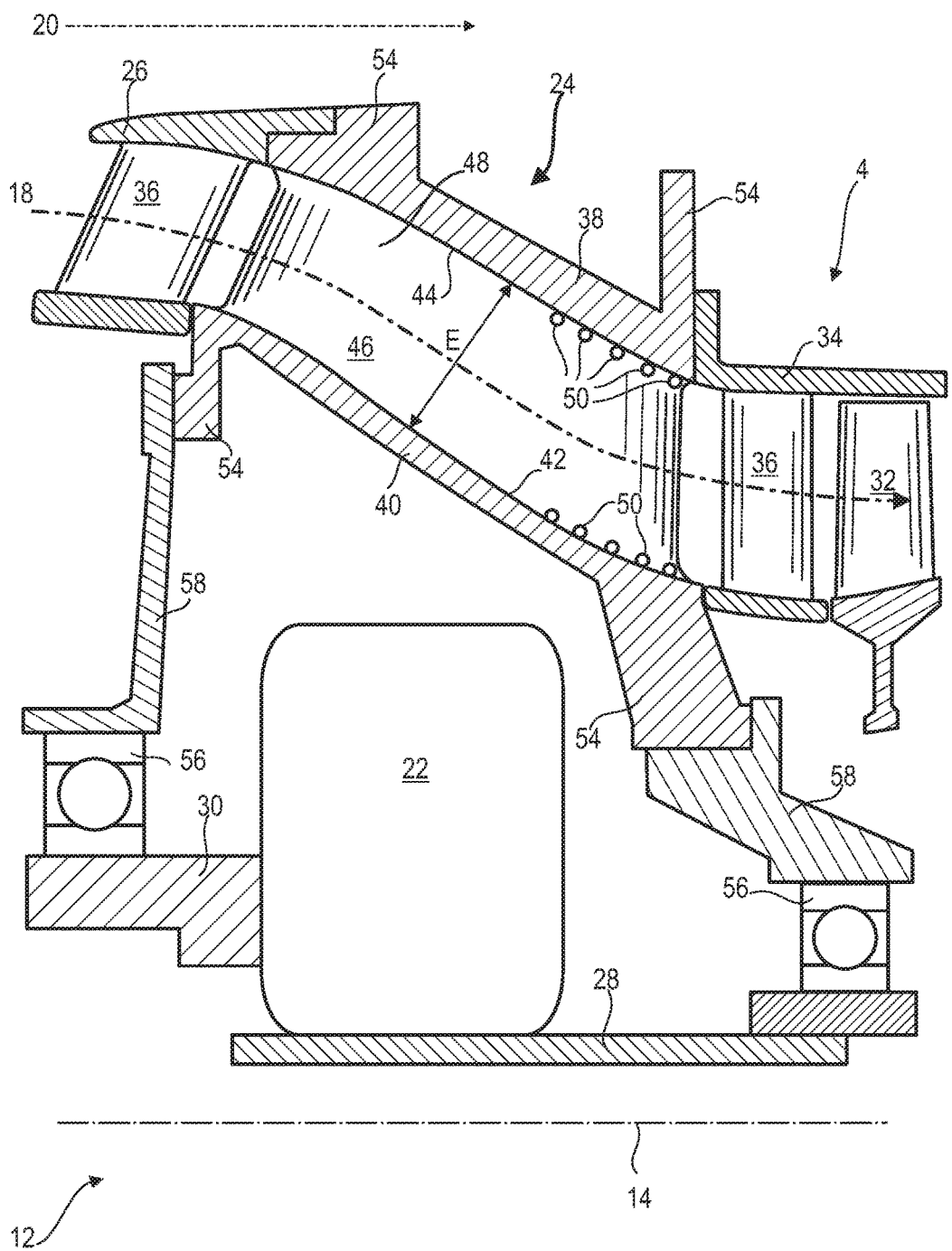
FIG. 2 depicts a rotor support casing according to the invention.

FIG. 2 is a cross-section of a support casing 24 of the rotor 12 of the turbine engine, wherein the turbine engine may be similar to that of FIG. 1.

We see there a portion of the low-pressure compressor 4, the demultiplication means 22, a nose 26 separating the primary flow 18 and secondary flow 20. The rotor 12 combines the fan and one or more drive shafts 28; 30. These drive shafts 28; 30 may be coupled to the demultiplication means 22 in order to actuate the fan and the rows of rotor vanes 32 of the compressor 4. These rotor vanes 32 may be placed inside the outer shroud 34 which supports the annular rows of stator vanes 36 of the compressor 4. The separating nose 26 may also comprise an annular row of stator vanes 36. In some cases, one or more rows of stator vanes may have variable pitch, i.e. variable orientation relative to the rotation axis 14.

The support casing 24 forms the structure or frame of the turbine engine. It is able to support the thrust force of the fan, as well as supporting the own weight of the turbine engine. It may also be known by the acronym FHF for Fan Hub Frame. It may be an intermediate casing.

It comprises an outer annular wall 38 and an inner hub 40. The wall 38 and the hub 40 are circular and coaxial. The hub 40 is surrounded by the wall 38 which envelops it. They each have an outer annular surface 42 and an inner annular surface 44 which face each other radially. These annular surfaces 42; 44 are radially spaced so as to provide between them an annular passage 46 through which the primary flow 18 passes. The wall 38 may comprise means for anchoring to the structure of the aircraft.

In order to connect the outer wall 38 physically to the inner hub 40, the support casing 24 has at least one, preferably several strut arms 48, for example eight, or ten, or twelve strut arms 48. Each strut arm 48 has a width, measured along the circumference of the hub 40, which may be greater than or equal to four or six times the thickness of a stator vane 36. These strut arms 48 are arranged in an annular row and each extend radially from one annular surface 42; 44 to the other. In operation, they cross the primary flow 18. They may extend axially over the majority of or substantially the entire length of the wall 38 and/or the hub 40. They may be hollow in order to receive equipment of the turbine engine, for example a motion transmission spindle.

In order to control the effect of their presence on the primary flow 18, at least one or more or each arm 48 comprises an orifice 50 or several orifices 50. Each orifice 50 communicates with the annular passage 46, in particular by opening therein. This or these orifices 50 are configured to allow suction of part of the primary flow 18, in particular at the level of the annular surfaces 42; 44. They may be separated from the wall 38 or hub 40 by less than 1.00 mm. Their radial positions may be partially or fully in the radius of connection to the ends of the strut arms 48. These arrangements facilitate the suction of vortices forming in the boundary layers.

The orifices 50 may be distributed over the side faces of the strut arms 48. They may follow a distribution along their arm 48. Optionally, they may be grouped in an axial portion of their arm 48, for example a downstream portion. For example, they may be grouped in the downstream quarter of the arm 48. Each arm 48 may be defined by a radial stack of aerodynamic profiles. These profiles may be parallel to the annular surfaces 42; 44. The downstream portion containing the orifices 50 may correspond to a zone in which the aerodynamic profiles become thinner in the downstream direction. Thus a vane 36 facing an arm 48 may lie in the axial extension of one or more orifices 50, such that the vortices they encounter at the foot and head are reduced.

The passage 46 has a thickness E perpendicular to the annular surfaces 42; 44. The thickness E may be a medium thickness, for example between two successive arms. The thickness E may vary axially according to the variation in diameters; it may comprise a radial component and an axial component. The orifices 50 may be placed at the ends of this thickness E, for example in the last 20% or 10% or 5% of the thickness E. These ends may be measured along the thickness E of the passage 46. In other words, these orifices may be arranged in the 20% or 10% or 5% of the aerodynamic profiles forming an end of the arm 48.

The support casing 24 may comprise annular flanges 54 extending radially. These annular flanges 54 may form the axial ends of the wall 38 and/or the hub 40. In particular, they allow the fixing of the separating nose 26 and the fixing of the outer shroud 34. Also, these flanges 54 allow the support of bearings 56, for example roller bearings, mounting the shafts 28; 30 in articulated fashion. This support function may be indirect, e.g. via attached annular connections 58.

The orifices 50 may comprise load loss means such as a calibrated section or insert.

The present figure shows a support casing with a low-pressure compressor downstream. The invention may however also apply to a casing downstream of the low-pressure compressor. A high-pressure compressor may replace a low-pressure compressor.

Figure 3:
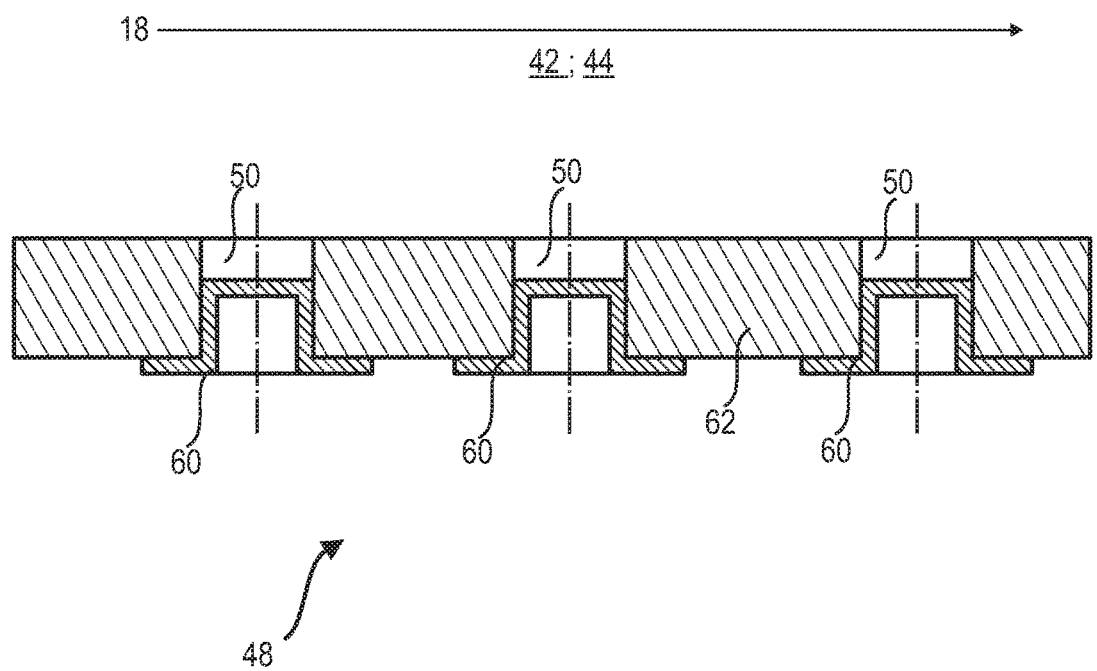
FIG. 3 illustrates a section of a series of orifices in an arm of the casing according to the invention.

FIG. 3 shows a succession of inserts 60 arranged in the orifices 50 of an arm 48. The primary flow 18 is depicted, together with one of the annular surfaces 42; 44 shown in the background.

The orifices 50 may be aligned along a flow line. They may be arranged along a curve which closely follows the curvature of their adjacent annular surface 42; 44. Their axial spacing may be variable.

The inserts 60 are introduced in the orifices 50 which pass through the partition 62 forming the envelope of the arm 48. The inserts 60 generally form caps. The flow collected by the orifices 50 may be used to pressurise a chamber of the turbine engine, in particular a chamber with a lubrication enclosure, the sealing joints of which require a pressure difference in order to reduce the spread of oil.

Figure 4:
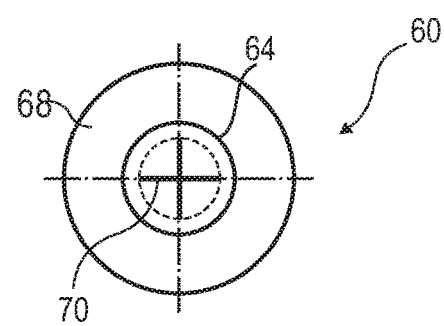
FIG. 4 shows a plan view of an insert for the orifice according to the invention.

FIG. 4 shows a plan view of an insert 60 fitted to one of the orifices of a casing arm. The insert 60 may be representative of those shown in relation to FIG. 3.

The insert 60 may correspond to that described in patent application EP 2 305 960 A1, filed on Apr. 11, 2009 by the company TECHSPACE AERO SA. The insert 60 may in particular comprise a tubular body 64 placed in the thickness of the partition wall of the arm, and an annular ring 68, also called a flange, placed against the partition wall of the arm. Opposite the ring 68, the body 64 may comprise several notches 70 delimiting movable blades. These blades allow control of a load loss and/or may open in response to a given pressure difference.

What is claimed is:

1. A turbojet engine comprising an annular primary flow, an annular secondary flow around the annular primary flow, a support casing and a rotor supported by the support casing, the support casing comprising:
   an outer annular wall with an inner annular surface encircling the annular primary flow;
   an inner hub supporting the rotor turbine engine and comprising an outer annular surface encircled by the annular primary flow;
   an annular passage between the annular wall and the inner hub axially crossed by the annular primary flow;
   an annular row of arms passing radially through the annular passage;
   the annular row of arms comprising a first arm with an orifice which communicates with the annular primary flow and which is arranged in the annular passage radially the level with one of the inner annular surface and the outer annular surface.

2. The turbojet engine according to claim 1, wherein each orifice of an arm is arranged in the downstream half of the corresponding arm.

3. The turbojet engine according to claim 1, wherein the first arm comprises a trailing edge, the orifice being arranged on the trailing edge.

4. The turbojet engine according to claim 1, wherein the first arm comprises an axial portion, the width of which reduces in the downstream direction, at least one or each orifice being arranged in said axial portion.

5. The turbojet engine according to claim 1, wherein the first arm comprises a surface forming a connecting radius with one of the annular surfaces, the orifice being formed radially within the connecting radius.

6. The turbojet engine according to claim 1, wherein the orifice is a first orifice, the first arm comprises a plurality of orifices which are identical to the first orifice and which are arranged in the annular passage radially level with one or both of the inner annular surface and the outer annular surface.

7. The turbojet engine according to claim 6, wherein the first arm of the casing comprises two circumferentially opposed side faces, the identical orifices being distributed between said two side faces.

8. The turbojet engine according to claim 1, wherein the row of arms also comprises a second arm with at least one second orifice arranged in the annular passage at the level of one of said annular surfaces, the orifice of the first arm being concealed from the orifice of the second arm by a curvature of the hub.

9. The turbojet engine according to claim 1, wherein an axial length of at least one or each arm is greater than a radial spacing between the inner annular surface and the outer annular surface.

10. The turbojet engine according to claim 1, wherein the orifice comprises an insert for controlling the trailing suction.

11. The turbojet engine according to claim 1, wherein the passage comprises a radial thickness E between the annular wall and the inner hub; along the thickness E, the orifice is arranged in at least one end of the arm; each end of the arm representing at most 10% of the thickness E.

12. Turbine engine comprising a rotor and at least one support casing of the rotor, the support casing comprising:
   an outer annular wall with an inner annular surface;
   an inner hub connected to the rotor of the axial turbomachine and comprising an outer annular surface;
   an annular passage between the annular wall and the inner hub;
   an annular row of arms crossing radially the annular passage;
   the annular row comprises a first arm with an orifice arranged in the annular passage and which projects radially from one of the inner annular surface and the outer annular surface.

13. The turbine engine according to claim 12, wherein it comprises a compressor with at least one annular row of stator vanes, at least one of said stator vanes being in the axial extension of the orifice.

14. The turbine engine according to claim 13, wherein along on circumference, the width of the arms is greater than twice or four times the width of the stator vanes.

15. The turbine engine according to claim 12, wherein the first arm comprises a housing, the turbine engine comprising a movable element arranged in said housing, the orifice of the first arm being axially remote from said movable element.

16. The turbine engine according to claim 12, wherein the hub delimits a pressurised chamber in communication with the orifice.

17. The turbine engine according to claim 12, wherein it comprises a bearing mounted inside the hub, the rotor comprising a transmission shaft mounted in articulated fashion via said bearing.

18. The turbine engine according to claim 12, wherein it comprises a fan supported axially and radially by the hub of the casing, and coupled to the rotor.

19. A support casing for a rotor for an axial turbine engine, the support casing comprising:
   an outer annular wall with an inner annular surface adapted to delimit a primary annular flow of the turbine engine;
   an inner hub with a bearing able to support the rotor of the axial turbine engine, and comprising an outer annular surface adapted to delimit a primary annular flow of the turbine engine;
   an annular passage between the annular wall and the inner hub, said annular passage axially crossing the support casing;
   an annular row of strut arms crossing the annular passage, the annular row of strut arms comprising a first strut arm with an orifice radially in the annular passage and arranged level with one of the inner annular surface and the outer annular surface.

20. The support casing according to claim 19, wherein the orifice projects radially from one of the inner annular surface and the outer annular surface, and the annular row of strut arms comprises at most ten strut arms.

* * * * *